July 20, 1965  F. C. HUTTO  3,195,908
FABRICATED PISTON RINGS
Filed Jan. 23, 1964  2 Sheets-Sheet 1

FRANK C. HUTTO
INVENTOR

BY *John H. Faulkner*
*Ernest A. Beutler*
ATTORNEYS

July 20, 1965

F. C. HUTTO 3,195,908

FABRICATED PISTON RINGS

Filed Jan. 23, 1964

FRANK C. HUTTO
INVENTOR

BY *John F. Faulkner*
*Ernest A. Beutler*
ATTORNEYS

United States Patent Office 3,195,908
Patented July 20, 1965

3,195,908
FABRICATED PISTON RINGS
Frank C. Hutto, Dearborn, Mich., assignor to Ford Motor Company, Dearborn, Mich., a corporation of Delaware
Filed Jan. 23, 1964, Ser. No. 339,810
11 Claims. (Cl. 277—206)

This application is a continuation-in-part of my co-pending applications entitled "Fabricated Piston Ring," Serial No. 69,348, filed November 15, 1960, and now abandoned, and Serial No. 73,407, filed December 2, 1960, now Patent No. 3,150,877, issued September 29, 1964.

This invention relates to piston rings for internal combustion engines and more particularly to improved light weight, fabricated steel piston rings.

An internal combustion engine employs piston rings interposed between the piston and cylinder wall surface to prevent gas leakage from the combustion chamber into the crankcase and to wipe excess oil from the cylinder wall. Generally, these two functions are performed by different types of piston rings. The sealing function is provided by a compression ring and the oil wiping function is served by an oil control ring. The conventional compression ring is a cast ring having a cylinder wall engaging surface. The conventional oil control ring has upper and lower cylinder wall wiping surfaces that are generally formed by separate ring parts called "rails." The rails are urged into contact with the cylinder wall surface by a separate, expander ring. Provision is made to direct the flow of excess oil entrapped between the wiping surfaces back into the oil sump.

Considerable weight saving can be realized by fabricating the piston ring from a single piece of light weight spring steel. In the case of an oil control ring, a fabricated ring will speed engine assembly since only one part need by inserted into the ring groove of the piston. Fabricated piston rings are shown in the U.S. Patents 1,445,020 to C. E. Johnson; 2,569,778 to H. P. Phillips and 2,631,908 to R. R. Teetor and British Patent 792,-922, dated April 9, 1958. This invention relates to an improved piston ring of this type.

It is a primary object of this invention to provide a light weight piston ring that is convenient to manufacture and assemble in the ring groove and is dependable in operation.

An internal combustion engine embodying this invention has a cylinder wall that receives a piston. The piston is provided with a ring groove that contains a fabricated piston ring. The fabricated piston ring has first and second flanges integrally connected by a web. The web has a surface in engagement with the cylinder wall. A third flange is integrally connected to the first flange remotely from the web. The first and third flanges are resiliently confined within the ring groove to provide effective side sealing.

In a first embodiment of the invention, the first and third flanges may be compressed by line contact with opposite sides of the ring groove. In this embodiment, the second flange may be spaced from one side of the ring groove.

In a second embodiment of the invention, the first and third flanges may be compressed by line contact with one side of the ring groove and a surface formed at the bottom of the ring groove. In this embodiment, the second flange may have a line contact with another side of the ring groove.

In any of the above embodiments the fabricated piston ring, that will function as a compression ring because of the effective side sealing, may also serve as an oil control ring. The oil control function is achieved by forming axially spaced cylinder wall engaging surfaces in the web. A plurality of perforations may be formed in the web between the cylinder wall engaging surfaces to permit oil to flow through the web. The oil is returned to the sump by oil return holes formed in the piston at the base of the piston ring groove.

Other objects and advantages of this invention will become more apparent when considered in conjunction with the accompanying drawings, wherein.

Figure 1:
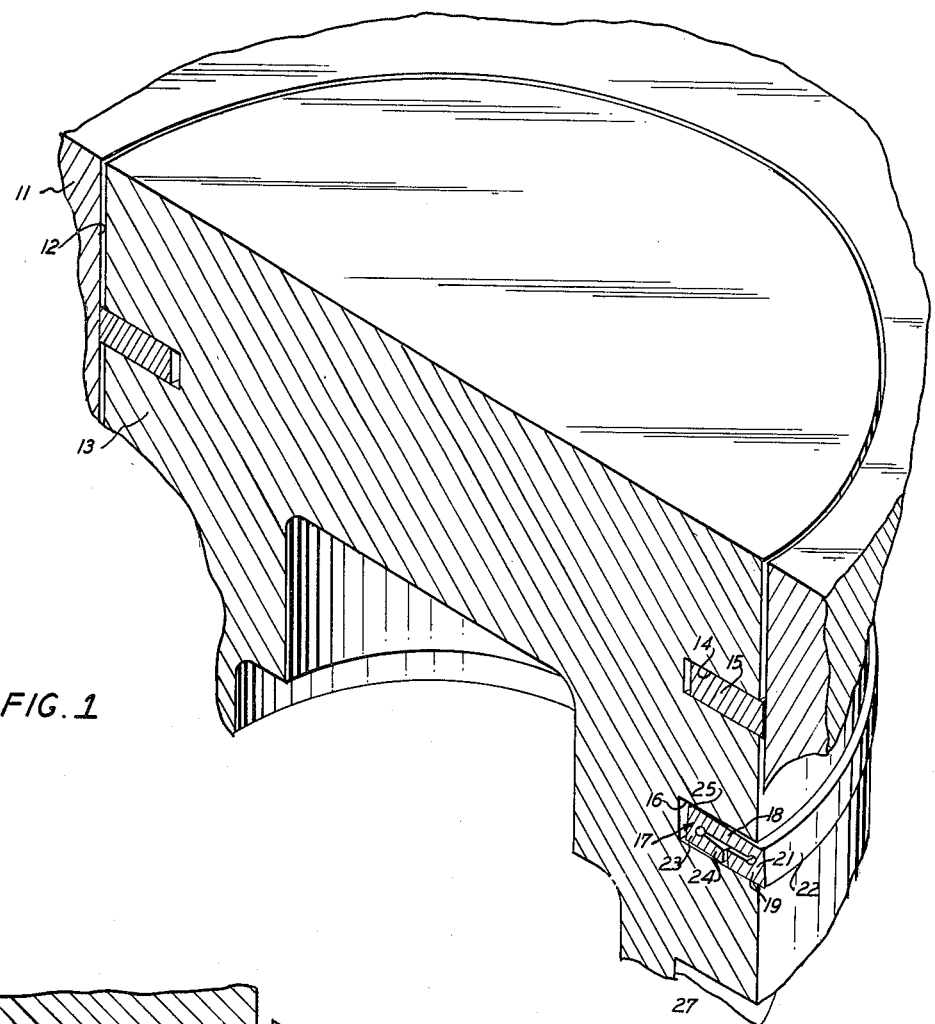
FIGURE 1 is a perspective view, with portions broken away, of an internal combustion engine showing a first embodiment of this invention.
Figure 2:
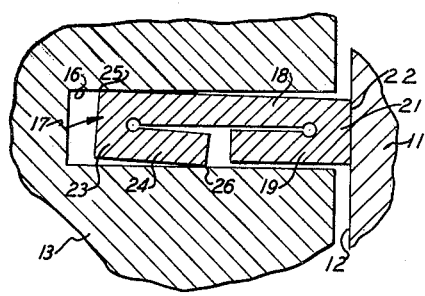
FIGURE 2 is an enlarged cross-sectional view showing the novel piston ring of FIGURE 1.

Referring now in detail to the embodiment shown in FIGURES 1 and 2, an internal combustion engine cylinder block is indicated by the reference numeral 11. The cylinder block 11 is formed with a cylinder wall surface 12 that supports a piston 13 for reciprocation. The piston 13 is formed with an upper piston ring groove 14 that receives a conventional compression ring 15 of any known type.

Below the upper piston ring groove 14, a second ring groove 16 is formed in the piston 13. A fabricated piston ring, indicated generally by the reference numeral 17, is received in the second piston ring groove 16. The fabricated piston ring 17 is formed from a single piece of light weight spring steel. The fabricated piston ring 17 comprises a first flange 18 and a second flange 19 that are integrally connected by a web 21 having a cylinder wall engaging surface 22. The first flange 18 extends radially inwardly for a major portion of the length of the ring groove 16. The second flange 19 is shorter in length and terminates within the outer half of the ring groove 16. Prior to the insertion in the ring groove 16, the flanges 18 and 19 may diverge in a radially inward direction or may be parallel, as shown.

At the inner termination of the first flange 18, an inner web 23 integrally connects a third flange 24 to the first flange 18. The first and third flanges 18 and 24 diverge in a radially outward direction when the fabricated piston ring 17 is not received in the piston ring groove 16. To insert the fabricated piston ring 17 into the second piston ring groove 16, it is necessary to compress the first and third flanges 18 and 24 bending them about the inner web 23. The compression of the flanges causes the first flange 18 to have a line contact, indicated by the reference numeral 25, with the upper side of the ring groove 16. The third flange 24 has a line contact, indicated by the reference numeral 26, with the lower side of the ring groove 16. The second flange 19 may be spaced from the lower side of the ring groove 16. The resilient line contacts of the flanges 18 and 24 with the opposite sides of the ring groove 16 insures effective side sealing between the fabricated piston ring 17 and the ring groove 16. In this instance, the piston ring 17 functions as a second compression ring.

A third piston ring groove 27 is formed below ring grooves 14 and 16. A conventional oil control ring (not shown) may be received in the ring groove 27 to provide oil control. If desired, a fabricated piston ring similar to the piston ring 17 may be inserted in the ring groove 27, if appropriate oil control venting is provided.

Figure 3:
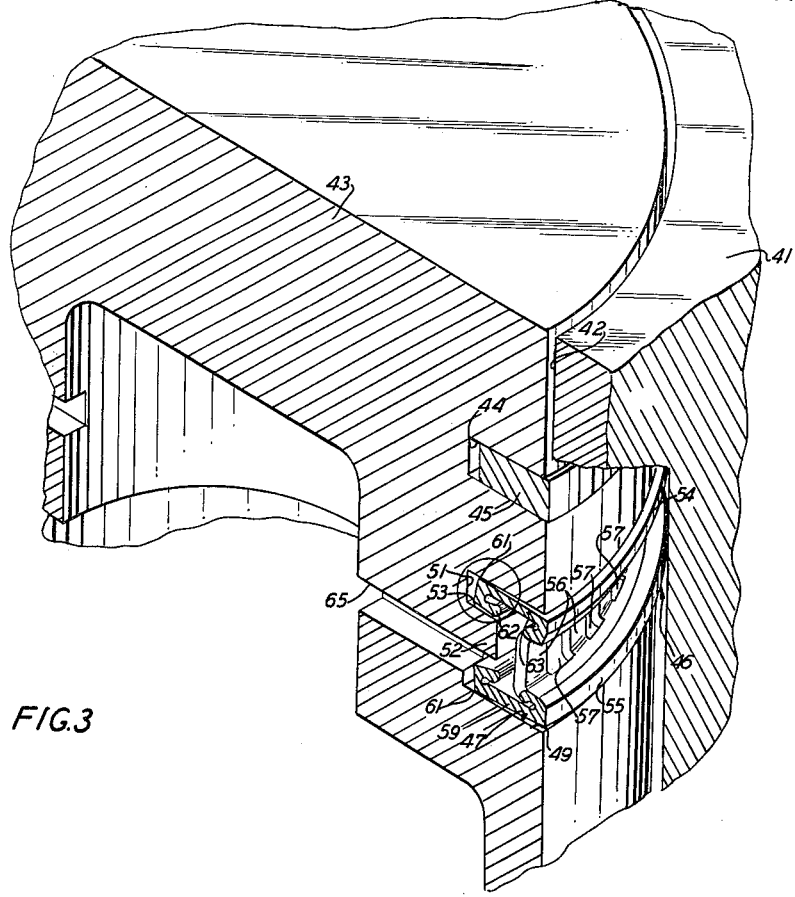
FIGURE 3 is a perspective view, with portions broken away similar to FIGURE 1, showing a second embodiment of the invention.
Figure 4:
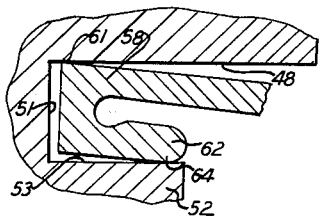
FIGURE 4 is an enlarged view of the encircled portion of FIGURE 3.

Referring now to the embodiment shown in FIGURES 3 and 4, the cylinder block of an internal combustion engine is identified generally by the reference numeral 41.

The cylinder block 41 is formed with a cylinder wall surface 42 that receives a piston 43. The piston 43 is formed with an upper ring groove 44 that receives a conventional compression ring 45.

A fabricated piston ring, indicated generally by the reference numeral 46, is received in a second ring groove, indicated generally by the reference numeral 47, located below the ring groove 44. The ring groove 47 has opposing upper and lower surfaces 48 and 49, respectively. An inner or bottom surface 51 opposes the cylinder wall surface 42. A ridge 52 extends from the inner surface 51 toward the cylinder wall surface 42. The ridge 52 has an upper surface 53 that opposes the upper ring groove surface 48.

The fabricated piston ring 46 is formed of spring steel and comprises a web having spaced upper and lower cylinder wall engaging surfaces 54 and 55, respectively. The cylinder wall engaging surfaces 54 and 55 are separated by an inwardly recessed portion 56 that is provided with a plurality of apertures 57 that form oil return vents. A first flange 58 extends radially inwardly from the upper cylinder wall engaging surface 54 into the ring groove 47. A similar, second flange 59 extends from the lower cylinder wall engaging surface 55 radially into the ring groove 47. The flanges 58 and 59 diverge radially inwardly so that they must be compressed upon insertion into the ring groove 47 by deforming them about the web. The compression results in the flanges 58 and 59 having a line contact with the adjacent ring groove sides 48 and 49. The points of contact are indicated by the reference numeral 61 and shown in greater detail in FIGURE 4.

Third and fourth flanges 62 and 63 extend radially outwardly from the first and second flanges 58 and 59, respectively. The flanges 62 and 63 converge toward a plane bisecting the piston ring 46 and diverge from the flanges 58 and 59, respectively, in the unassembled state. The third flange 62 is resiliently urged toward the first flange 58 by a line contact, indicated by the numeral 64 and shown in greater detail in FIGURE 4, with ridge surface 53.

The resilient line contact between the flanges 58 and 62 and the ring groove 47 and provide an effective seal between the fabricated piston ring 46 and the piston 43 to preclude leakage of any blowby gasses that may escape past the upper compression ring 45. The cylinder wall engaging surface 54 therefore acts as a compression seal as well as providing oil control.

Oil that is wiped from the cylinder wall surface 42 by the piston ring surfaces 54 and 55 may flow to the rear of the piston ring 46 through the apertures 57. The oil is drained to the interior of the piston 43 by a plurality of radially extending vent holes 65 (only one of which is shown) formed at the inner ring groove surface 51 below ridge 52.

It should be noted that the fabricated piston ring 46 is symmetrical about a bisecting plane extending through the center of the web so that the ring 46 may be inserted in the ring groove 47 with either side up.

Figure 5:
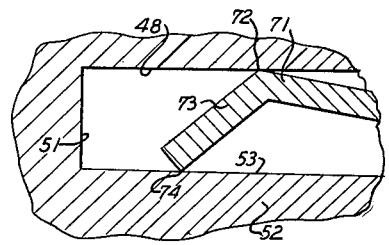
FIGURE 5 is an enlarged view, in part similar to FIGURE 4, showing a third embodiment of the invention.

The embodiment shown in FIGURE 5 is substantially the same as that shown in FIGURES 3 and 4. For this reason only the portion of the fabricated piston ring that differs from the embodiment in FIGURES 3 and 4 has been illustrated. The difference in the piston ring construction occurs at the inner end of the fabricated piston ring. The differences are illustrated in FIGURE 5, that is similar to FIGURE 4 in that it represents an enlarged view of the encircled area of the engine shown in FIGURE 3. The piston ring groove is the same as that in FIGURES 3 and 4 and therefore is identified by the same reference numerals.

The piston ring has a first flange 71 and a symetrically opposite second flange (not shown). The flanges diverge radially inwardly of the ring groove and have a line contact therewith, indicated by the reference numeral 72. The first and second flanges must be compressed upon insertion into the ring groove. A third flange 73 is integrally connected to the first flange 71 and extends radially inwardly therefrom. The third flange 73 also converges toward a plane bisecting the piston ring. It is to be understood that a similar flange is formed at the inner termination of the lower flange so that the piston ring may be inserted either side up in the ring groove 47.

The third flange 73 is resiliently confined between the upper surface 53 of ridge 52 and the upper ring groove surface 48. The lower end of the flange 73 has a line contact with the upper ridge surface 53, indicated by the reference numeral 74. It should be readily apparent that side sealing is effected in the same manner as in the embodiment of FIGURES 3 and 4.

It is to be understood that the embodiments shown and described are exemplary of preferred forms the invention may take. Other changes and modifications may be made without departing from the spirit and scope of the invention, as defined by the dependent claims.

I claim:

1. An internal combustion engine having a cylinder wall, a piston received in said cylinder wall, a ring groove in said piston, and a fabricated piston ring in said ring groove, said fabricated piston ring having a first flange, a second flange, a web integrally connecting said first and second flanges, said web having a surface in engagement with said cylinder wall, said first and second flanges being in contact with a surface of said ring groove whereby they are resiliently confined within said ring groove, and a third flange integrally connected to said first flange and having a line contact with a surface of said ring groove.

2. An internal combustion engine comprising a cylinder wall, a piston received in said cylinder wall, a ring groove in said piston, and a fabricated piston ring in said ring groove, said fabricated piston ring having axially spaced first and second flanges, a web integrally connecting said flanges, said web having a surface in engagement with said cylinder wall, and a third flange integrally connected to said first flange, said first and second flanges diverging radially inwardly of said ring groove, said first and third flanges diverging radially outwardly of said ring groove, said first and second flanges being in contact with a surface of said ring groove whereby they are resiliently confined within said ring groove and said third flange being resiliently urged toward said first flange by a surface of said ring groove.

3. An internal combustion engine comprising a cylinder wall, a piston having a ring groove, said ring groove having a peripheral ridge in the bottom thereof, a fabricated piston ring in said ring groove, said fabricated piston ring having at least a first flange, an axially spaced second flange, and a web integrally connecting said first and second flanges to define axially spaced cylinder wall engaging surfaces, one of said flanges having a line contact with a side of the ring groove, the other of said flanges being resiliently confined by line contact between the side of the ridge and the adjacent side of the ring groove.

4. An internal combustion engine having a cylinder wall, a piston received in said cylinder wall, a ring groove in said piston, said ring groove having a peripheral ridge in the bottom thereof, and a fabricated piston ring in said ring groove, said fabricated piston ring having a first flange, an axally spaced second flange, a web integrally connecting said first and second flanges, said web having a surface in engagement with said cylinder wall, said first and second flanges being resiliently confined between opposing sides of said ring groove, and a third flange integrally connected to said first flange remotely from said web, said third flange extending toward a side of said ridge and being resiliently confined by line contact therewith.

5. An internal combustion engine as defined by claim 4 wherein the third flange extends radially inwardly of the ring groove from the first flange.

6. An internal combustion engine as defined by claim 4 wherein the third flange extends radially outwardly of the ring groove from the first flange.

7. An internal combustion engine comprising a cylinder wall, a piston having a ring groove, said ring groove having a peripheral ridge in the bottom thereof, a fabricated piston ring in said ring groove, said fabricated piston ring having axially spaced first and second flanges, a web integrally connecting said first and second flanges said web having axially spaced cylinder wall engaging surfaces, a third flange connected to one of said first and second flanges, one of said flanges having a line contact with a side of the ring groove, the other flanges being resiliently confined between the side of the ridge and another side of the ring groove, said other flanges having a line contact with the side of the ridge and said other side of the ring groove.

8. An internal combustion engine comprising a cylinder wall, a piston having a ring groove, a fabricated piston ring in said ring groove, said fabricated piston ring having axially spaced first and second flanges, a web integrally connecting said first and second flanges, a third and fourth flange integrally connected to said first and second flanges respectively, said first and second flanges diverging radially inwardly from a radial plane and said third and fourth flanges diverging radially outwardly from a radial plane in the assembled position in said ring groove, said first and second flanges and at least one of said third and fourth flanges having a line contact with an associated side of the ring groove.

9. An internal combustion engine comprising a cylinder wall, a piston having a ring groove, said ring groove having a peripheral ridge in the bottom thereof, a fabricated piston ring in said ring groove, said fabricated piston ring having axially spaced first and second flanges, a web integrally connecting said first and second flanges, said web having spaced cylinder wall engaging surfaces, a third flange integrally connected to said first flange and diverging radially outwardly therefrom, said second flange having a line contact with a first side of said ring groove, said third and said first flanges being resiliently confined between a second side of said ring groove and a side of said ridge, said first and third flanges having a line contact with said second side of said ring groove and the side of said ridge, respectively.

10. An internal combustion engine comprising a cylinder wall, a piston having a ring groove vented at the bottom to define an oil return, a fabricated piston ring in said ring groove, said fabricated piston ring having axially spaced first and second flanges, a web integrally connecting said flanges, said web having axially spaced cylinder wall engaging surfaces separated by a surface having at least one perforation therein, a third flange integrally connected to said first flange, a ridge formed in the bottom of said ring groove at one side of said oil return, said first and said third flanges being resiliently confined between a side of said ridge and a side of said ring groove, said first and said second flanges being resiliently confined between the sides of said ring groove.

11. An internal combustion engine comprising a cylinder wall, a piston having a ring groove, said ring groove having a peripheral ridge in the bottom thereof, a fabricated piston ring in said ring groove, said fabricated piston ring having axially spaced first and second flanges, a web integrally connecting said first and second flanges to define axially spaced cylinder wall engaging surfaces, a third flange integrally connected to said first flange, a fourth flange integrally connected to said second flange, said second flange having a line contact with a side of the ring groove, said first and third flanges being resiliently confined between the side of the ridge and the side of the ring groove, said first and third flanges having a line contact with the side of the ridge and the side of the ring groove.

References Cited by the Examiner
UNITED STATES PATENTS

| 1,445,020 | 2/23 | Johnson | 277—208 |
| 1,963,151 | 6/34 | Russell. | |
| 2,387,854 | 10/45 | Phillips | 277—214 |
| 2,631,908 | 3/53 | Teetor | 277—200 |

FOREIGN PATENTS 792,922   4/58   Great Britain.

LEWIS J. LENNY, *Primary Examiner.*
SAMUEL ROTHBERG, *Examiner.*